United States Patent [19]
Burnham et al.

[11] 3,815,983
[45] June 11, 1974

[54] AUTOMATIC REWIND MECHANISM FOR MOTION PICTURE PROJECTOR

[75] Inventors: William L. Burnham; Kenneth W. Thomson, both of Rochester, N.Y.

[73] Assignee: Eastman Kodak Company, Rochester, N.Y.

[22] Filed: May 2, 1973

[21] Appl. No.: 356,701

[52] U.S. Cl. ................................................. 352/124
[51] Int. Cl. ............................................ G03b 23/00
[58] Field of Search .................................... 352/124

[56] References Cited
UNITED STATES PATENTS
2,009,442   7/1935   Foster ................................ 352/124

*Primary Examiner*—Monroe H. Hayes
*Attorney, Agent, or Firm*—Lawrence P. Kessler

[57] ABSTRACT

An automatic rewind mechanism for a motion picture projector in which an operative slide is provided to establish the position of the film gate, the position of the pulldown claw, the position of an optical douser and set the drive mode for the supply and take-up spindles when rewind is desired. The operative slide is controlled by a release latch which, in turn, may be triggered by either a film tension sensing snubber or a manual "run-rewind" control selector. The control selector is automatically shifted to its "rewind" indicating position when the operative slide is actuated by tension sensing initiated triggering of the release latch.

5 Claims, 6 Drawing Figures

AUTOMATIC REWIND MECHANISM FOR MOTION PICTURE PROJECTOR

BACKGROUND OF THE INVENTION

1. Field of the Invention

This invention relates generally to motion picture projectors and more particularly to motion picture projectors having automatic rewind mechanisms.

2. Description of the Prior Art

In motion picture projectors it is common to provide a mechanism which is capable of driving a filmstrip at normal forward (run) and reverse projection speeds as well as to rewind the film at high speed. It is desirable to have the rewind of the film accomplished automatically without requiring manual rethreading for the rewind operation. Apparatus capable of performing such a function are shown in the U.S. Pat. Nos. 3,300,155 in the name of Roman and Re. in the name of Mitchell et al. The particular apparatus of each of these patents include a projector of the type wherein a film-pull-down claw mechanism intermittently advances the film past an apertured film gate. The rewind path is substantially the same as the forward drive path with the pull-down claw being disengaged and the pressure pad of the apertured film gate withdrawn. The rewind function may be automatically triggered by monitoring the tension on the film and sensing increased tension generated when the end of the film has been reached (the film end is fixed to the supply reel), or may be initiated by manually moving a reversing lever. The manual control of the reversing lever is independent of the tension monitoring device so that when automatic rewind is initiated by tension sensing, the manual control is not affected. Therefore, the projector provides no visual indication to the operator that the projector is in the rewind mode.

SUMMARY OF THE INVENTION

In view of the above, it is a primary object of this invention to provide an improved automatic rewind mechanism for a motion picture projector wherein the rewind mode of operation may be initiated manually by movement of a "run-rewind" control selector or automatically by senswng a condition of the film being projected and wherein the "run-rewind" control selector is moved to a "rewind" indicating position when automatic rewind mode is initiated by condition sensing.

Accordingly, there is herein provided an automatic rewind mechanism for a motion picture projector in which an operative slide is provided to establish the position of the film gate, the position of the pulldown claw, the position of an optical douser and set the drive mode for the supply and take-up spindles when entrance to the rewind mode is desired. The operative slide is controlled by a release latch which, in turn, may be triggered by either a film tension sensing snubber or a manual "run-rewind" control selector. The control selector is automatically shifted to its rewind indicating position when the operative slide is actuated by tension sensing initiated triggering of the release latch.

BRIEF DESCRIPTION OF THE DRAWINGS

FIG. 4 is a perspective view of the projector film reel drive mechanism and the control arm for changing the direction of film drive;

DESCRIPTION OF THE PREFERRED EMBODIMENTS

Figure 1:
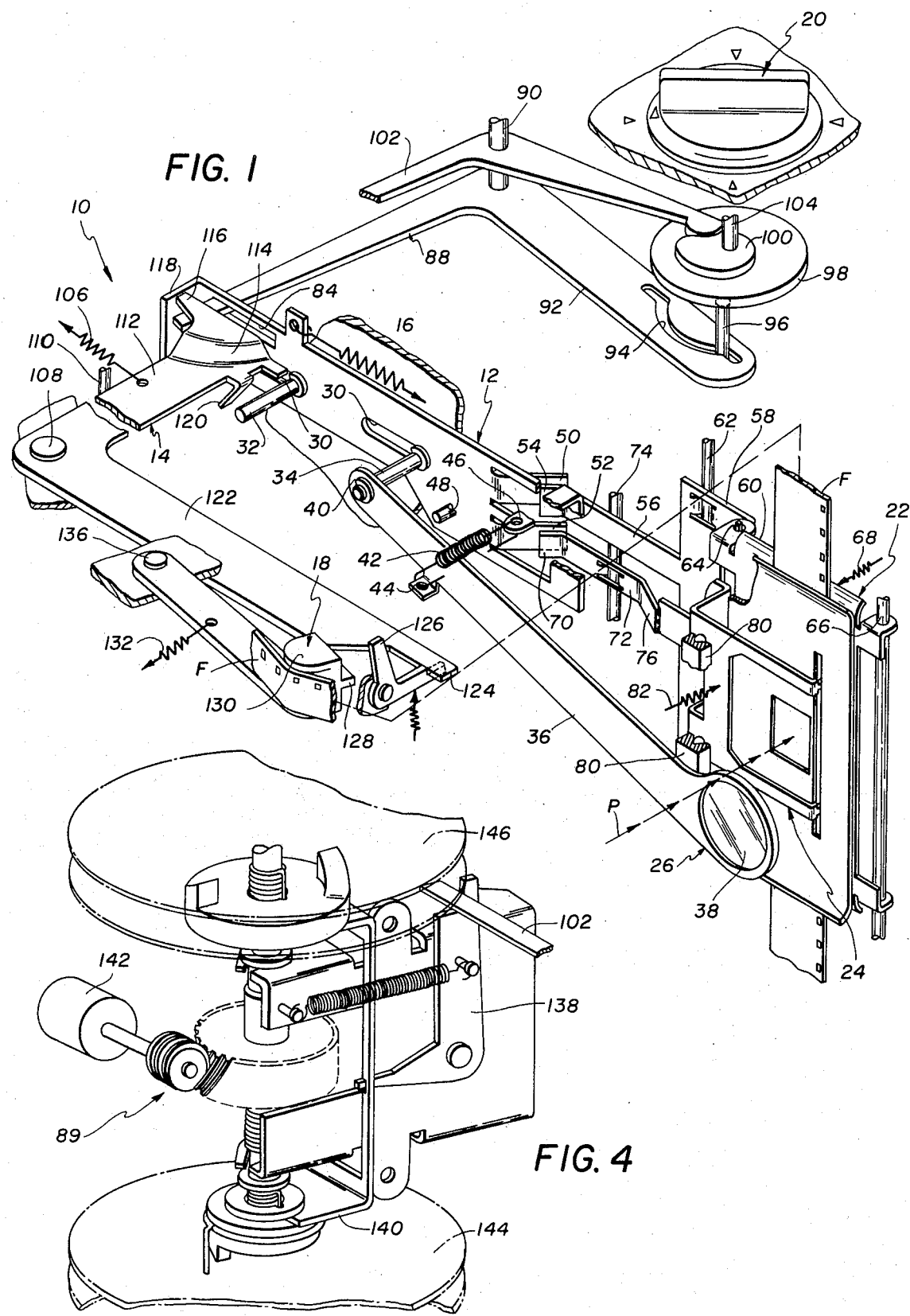
FIG. 1 is a perspective view of the automatic rewind mechanism according to this invention showing particular projector elements in position for the forward projection mode of operation.

Referring now to the drawings, FIG. 1 shows an automatic rewind mechanism 10 having a rewind slide 12 retained against the bias of a spring 16, in a first position during forward projection of motion picture film F by a release latch 14 which engages the slide 12. The release latch 14 may be actuated to release the rewind slide 12 by either by a film-condition-sensing device 18 or a manual "run-rewind" control knob 20. The rewind slide 12 is operatively connected with a film gate 22, a pull-down claw 24, an optical douser 26 and a drive mode selection lever 28 such that movement of the rewind slide 12 from the first position to a second position to establish the rewind mode of operation will move each of these elements from their normal operative positions occupied during the forward projection mode to a particular position during the rewind projection mode.

The rewind slide 12 has a pair of limit determining slots 30 through which structural frame mounted pins 32 and 34 will extend, to both support and limit the movement of the rewind slide 12 between the first position and the second position. Mounted for pivotal movement about the pin 34 is an elongated arm 36 of the optical douser 26. The arm 36 serves to support a filter 38 at one end and is pivotally mounted on the pin 34 at the other end 40. A spring member 42 is interconnected between a tab 44 extending from the arm 36 and a tab 46 connected to the rewind slide 12. Through the interconnection of the spring 42, pivotal movement of the arm 36 about the pin 34 to engagement with a stop 48 is controlled by movement of the rewind slide 12 from the first position to the second position in the manner to be explained hereinbelow.

Adjacent one end, the rewind slide 12 has a pair of outwardly extending tabs 50 and 52 which are formed at an acute angle with the slide. The tab 50 is positioned to selectively engage a tab 54 when the slide 12 moves to its second position. The tab 54 is connected through an arm 56 to a plate 58 which controls the location of a pressure pad 60 of the film gate 22. The interaction of tab 50 with tab 54 will cause the plate 58 to pivot counterclockwise about a pivot pin 62. Since the pressure pad 60 is interconnected at one edge with the plate 58 by means of a pin and slot connection 64 and is mounted for pivotal movement about a pin 66 at the other edge thereof, the rotation of plate 58 will cause the plate 60 to rotate clockwise about the pin 66 against the bias of a spring 68 to an open position (see FIG. 2) required to permit the film F to be freely rewound.

The tab 52 is positioned to selectively engage a tab 70 when the rewind slide 12 moves to its second position. The tab 70 is connected to an arm 72 which is mounted for pivotal movement about the pin 74. On the opposite end of the arm 72 is a tab 76 which is positioned so as to be engageable with a tab 78 connected to the pull-down claw mechanism 24. The engagement of the tab 76 with the tab 78 occurs when the arm 72 is pivoted counterclockwise about the pin 74 by the interaction of tabs 52 and 70 which causes the pull-down claw mechanism 24 to be pivoted clockwise about the claw drive mechanism 80 against the bias of a spring 82 to a non-film engaging position (see FIG. 2) required to permit the film F to be freely rewound.

Adjacent the end of the rewind slide 12 opposite the location of the tabs 50 and 52, there is a slot 84 which is engaged by an arm 86 of a drive mechanism reversing lever 88. The drive mechanism reversing lever 88 serves to actuate a film reel drive mechanism 89, the construction and function of which are more fully described in U.S. Pat. application Ser. No. 356,699 filed herewith in the name of John J. Bundschuh et al., entitled "Movie Projector Operating and Spindle Mode Selection Mechanism." The drive mechanism 89 is shown in FIG. 4 and described herein only to the extent necessary for a complete understanding of this invention. The drive mechanism reversing lever 88 is mounted for pivotal movement about a pin 90. The lever 88 has a second arm 92 connected at an angle with the arm 86. The arm 92 has an arcuate slot 94 formed therein. A pin 96 extending through the slot 94 is connected to a cam plate 98 which supports a slew cam 100 forming a cam means for positioning a slewing lever 102 to control the operational mode of the projector. As shown in FIG. 4, the slewing lever 102 engages a positioning lever 138 to orient a drive clutch mechanism 140 to positively engage a drive from motor 142 to either a film take-up reel 144 when in the forward projection mode or a film supply reel 146 when in the rewind projection mode. The cam plate 98 and slew cam 100 are fixed for rotation with a shaft 104 which is connected to the "run-rewind" manual control knob 20. The shape of the slot 94 in the arm 92 is selected such that movement of the pin 96 in the slot 94 will coordinate the movement of the drive mechanism reversing lever 88 and the "run-rewind" control knob 20.

Thus, if the knob 20 is moved from the "run" position of FIG. 1 to the "rewind" position (FIG. 5), the cam plate 98 will be rotated by the shaft 104 so as to move the pin 96 which will cause the drive mechanism reversing lever 88 to rotate counterclockwise about the pin 90. Such movement will cause release of the latch 14, in a manner to be explained hereinbelow, for the purpose of permitting the rewind slide to move to its second position wherein the film gate 22, film claw 24 and optical douser 26 will be moved to the appropriate positions necessary in accomplishing the rewind mode of operation. Alternatively, the latch 14 may release the rewind slide 12 by actuation of the film condition sensing device 18 (see FIG. 2) at which time the slot 84 will interact with the arm 86 to rotate the drive mechanism reversing lever 88 counterclockwise about the pin 90. Movement of the lever 88 will cause the slot 94 to interact with the pin 96 to rotate the cam plate 98 so as to cause rotation of the shaft 104. This rotation will relocate the slew cam 100 to reposition the slewing lever 102 to pivot the positioning lever 138 to set the drive mechanism 89 for the film supply and take-up reels 144, 146 to establish a rewind mode of operation and simultaneously will rotate the "run-rewind" control knob 20 to its position for visually indicating that the projector drive mechanism is in its rewind mode of operation.

The release latch 14 is biased by means of a spring 106 about a pivot 108 to a position against a stop 110. The latch 14 has a first arm 112 with a ramp portion 114 extending upwardly from one end thereof terminating in a finger 116 which is normally engageable with a tab 118 formed integrally with the rewind slide 12. Extending downwardly from the arm 112 is a tab 120 formed at an acute angle to the arm 112. A second arm 122 connected to the arm 112 has a finger 124 which is engaged with a pivotable latch 126. The latch is normally engaged with the finger 124 to maintain the position of the release latch 14 against the stop 110 so that the finger 116 will act against the tab 118 of the rewind slide 12 to maintain the slide in its first position during the forward operational mode of the projector. The latch 126 is pivoted to release the finger 124 by a finger 128 of a tension sensing snubber 130 of the film condition sensing device 18. The snubber 130 engages the film F and applies a tension thereto by a spring force generated by a spring 132 acting on an arm 134 carrying the snubber 130, the arm 134 being pivotable about the pivot pin 136.

Figures 2, 3:
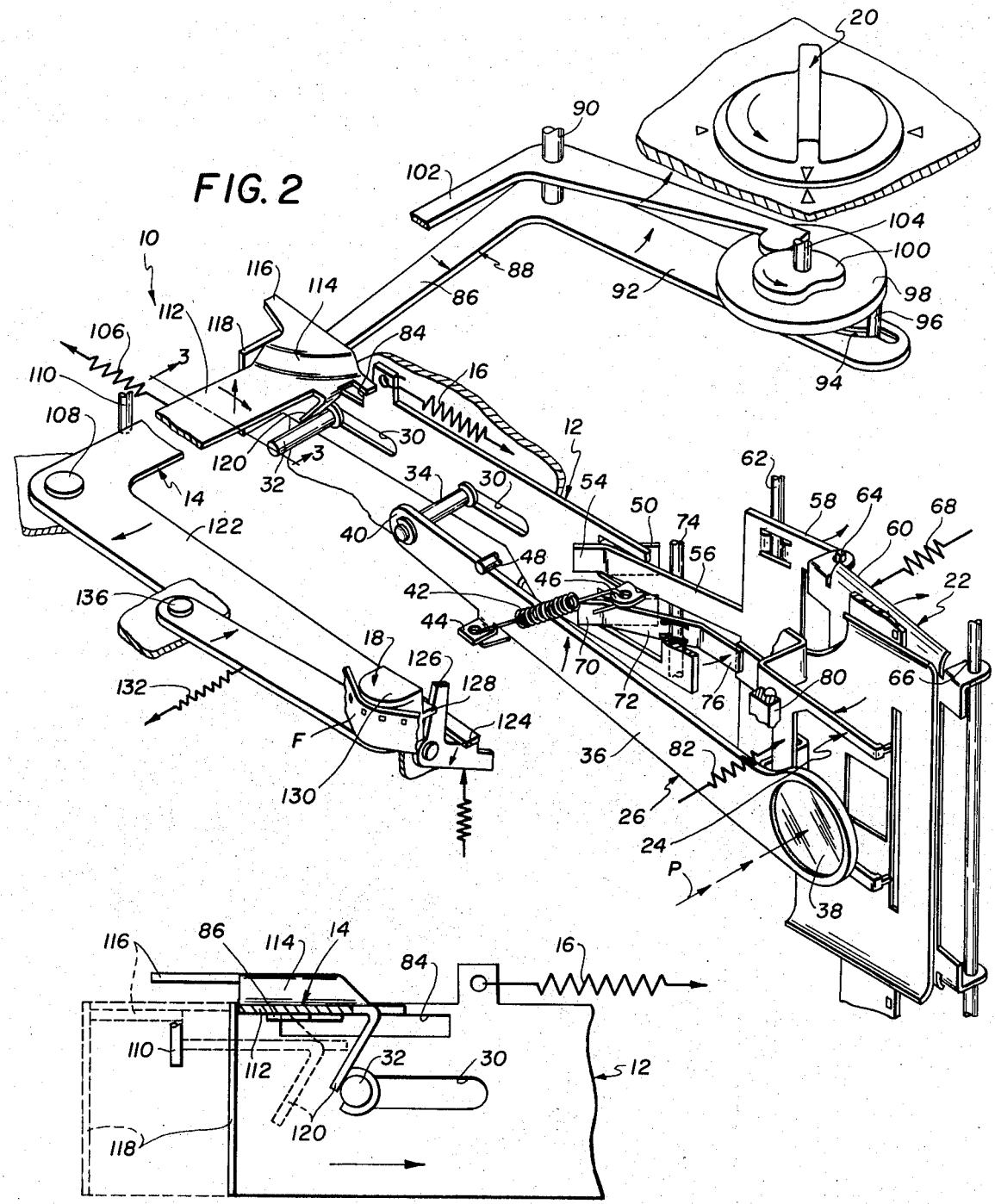
FIG. 2 is a perspective view of the automatic rewind mechanism similar to that of FIG. 1 showing the actuation of the rewind mechanism with the projector elements in their position when the rewind mode is initiated by film tension.
FIG. 3 is a side elevational view of the rewind slide and release latch showing the relation therebetween upon movement from the forward projection position (phantom lines) to the "rewind" position (solid lines) when the rewind cycle is initiated by the film tension.

To enter the rewind mode of operation based on a sensing of film condition, the film condition sensing device 18 will be activated by tension in the film F when the film tension overcomes the bias of the spring 132 to move the snubber in a counterclockwise direction about the pivot 136 such that the finger 128 will engage the pivotable latch 126 (see FIG. 2). Such an action, of course, occurs when the end of the film, which is fixed to a standard film reel, is reached. The movement of the latch 126 releases the finger 124 so that the release latch 14 is free to move in a clockwise direction about the pivot 108. This action is accomplished because the force exerted by spring 116 on the rewind slide 12 is greater than that exerted thereon by the spring 106 which is urging the release latch 114 in a counterclockwise direction about the pivot 108. The tab 118 engaging the finger 116 will cause the release latch 14 to move in the clockwise direction until the tab 120 engages the pin 32. As seen in FIGS. 2 and 3, the engagement of the tab 120 with the pin 32 will cause the release latch 14 to move upwardly (the pivot 108 permitting limited movement about a transverse axis therethrough) to the extent that the finger 116 will be at an elevation above the tab 118 permitting the rewind slide 12 to move beneath the release latch 14 to its second position where the left-hand ends of the slots 30 engage the position determining pins 32. As the slide 12 moves under the release latch 14 the latch will be freed to return to its initial latching position by spring 106. The movement of the slide 12 will result in the movement of the arm 86 of the drive mechanism reversing lever 88 which, of course, moves with the slot 84 and further will result in the opening of the film gate 22, the retraction of the pull-down claw 24, and the insertion of the optical douser 26 into the projection path by the interaction of the tabs 50 and 52 with the tabs 54 and 70 and the action of the spring 42 connected between the tabs 44 and 46 respectively as fully explained above. The pivoting of the drive mechanism reversing lever 88 about the pin 90 will accomplish movement of the pin 96 in the slot 94 to reposition the "run-rewind" control knob 20 to the "rewind" indicating position as well as repositioning the slewing lever 102 to reset the film reel drive mechanism 89 to its rewind estblishing mode of operation.

Figure 5:
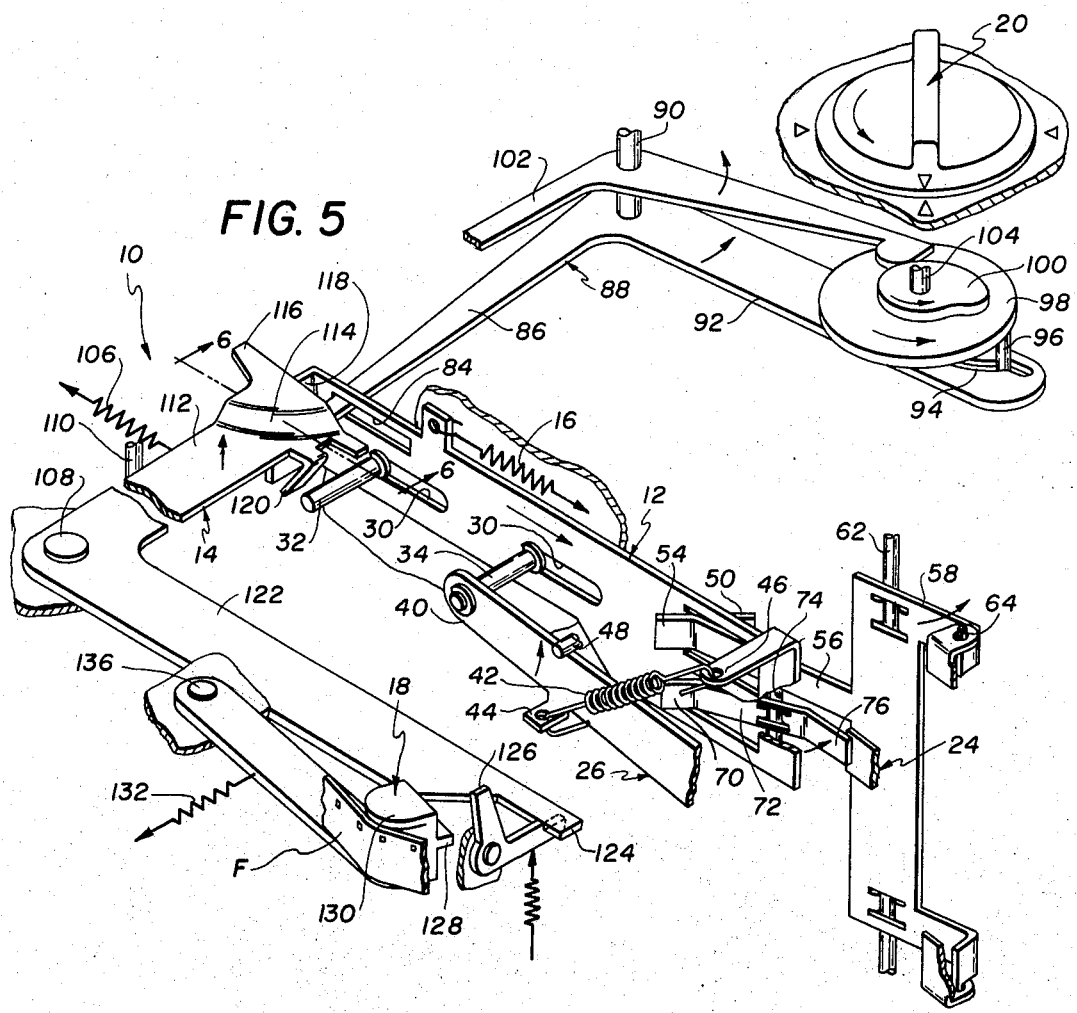
FIG. 5 is a perspective view of the automatic rewind mechanism similar to FIG. 1 showing the actuation of the rewind mechanism with the projector elements in their position when the rewind mode is initiated by manual movement of the control selection knob.
Figure 6:
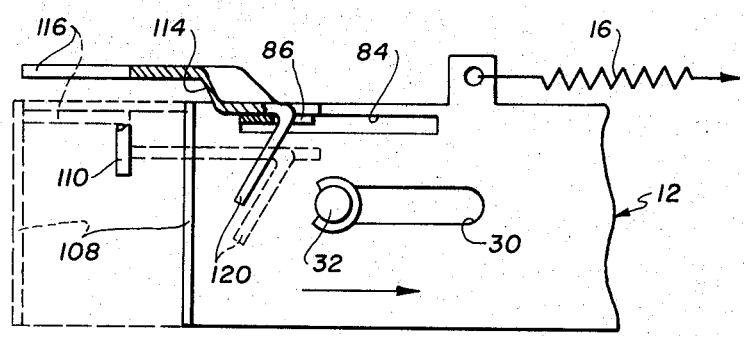
FIG. 6 is a side elevational view of the rewind slide and release latch showing the relation therebetween on movement from the forward projection position (phantom lines) to the position (solid lines) when the rewind cycle is manually initiated.

If the automatic rewind cycle is desired to be entered manually at some time prior to the end of a particular film reel, the "run-rewind" control know 20 may be manually moved to its "rewind" indicating position which will result in the release of the release latch 14 in the manner shown in FIGS. 5 and 6 and movement of the slewing lever 102 to reset the film drive mechanism 89 for rewind. The movement of the knob 20 will cause the pin 96 to rotate the drive mechanism reversing lever 88 in the slot 84 of the rewind slide 12. The end of the arm 86 will engage the underside of the ramp 114 of the release latch 14 elevating the release latch such that the finger 116 thereof will clear the tab 118 of the rewind slide 12. The rewind slide 12 will thus be permitted to move under the bias of spring 16 to its second position to accommodate the rewind mode of operation in the same manner as movement of the slide sets the position of the projector elements when the slide is tension activated as described above. That is to say, the film gate 22 and pull-down claw 24 will be moved to their film disengaging positions, and the optical douser 26 will be moved to intercept the projection path P to accomplish the necessary arrangement of the elements to enable the projector to function in the rewind mode of operation. Return of the knob 20 to the "run" indicating position will return the rewind slide 12 to the position of FIG. 1 by action of arm 86 in the slot 84. As noted above the release latch 14 is biased to its latching position by spring 106 so that relatching will be accomplished as soon as the tab 118 moves beyond finger 116.

From the foregoing it is readily apparent that there is herein provided a novel automatic rewind mechanism for a motion picture projector. The automatic rewind mechanism has an operative slide which is moved from a first position occupied during the forward projection mode to a second position occupied during the reverse projection mode. In the second position the slide serves to establish the position of the film gate, the pull-down claw and the optical douser necessary to permit automatic rewind as well as resetting the drive mechanism for the film supply and take-up reels. The operative slide is permitted to move to its second position by a release latch which, in turn, may be triggered by either a film condition sensor, such as a tension sensing snubber, or a manual "run-rewind" control selector. The control selector is automatically shifted to its "rewind" indicating position when the operative slide is actuated by condition sensing initiated triggering of the release latch.

The invention has been described in detail with particular reference to a preferred embodiment thereof, but it will be understood that variations and modifications can be effected within the spirit and scope of the invention.

We claim:

1. In a motion picture apparatus in a forward projection mode and a rewind mode, said apparatus including a film supply reel and a film take-up reel, a film projection gate, a film transport means for driving film from said supply reel to said take-up reel along a predetermined path through said projection gate in said forward projection mode, and means for driving said supply reel in order to rewind the film thereon when said apparatus is in said rewind mode, an improved mechanism for automatically initiating said rewind mode, the improvement comprising:

an operative slide movable between a first position and a second position, means responsive to movement of said operative slide to its second position to open said gate to permit unrestricted passage of film therethrough, means responsive to movement of said operative slide to its second position to render said transport means inoperable, and said means responsive to movement of said operative slide to its second position to activate said means for driving said supply reel;

a release latch for retaining said operative slide in its first position when said motion picture apparatus is in said forward projection mode and selectively actuatable to release said operative slide when said rewind mode is to be initiated;

first release means responsive to a condition of the film in said predetermined path for selectively actuating said release latch;

second release means for selectively actuating said release latch, said second means being manually operable between a first position giving a visual indication that the motion picture apparatus is in its forward projection mode and a second position giving a visual indication that the motion picture apparatus is in its rewind mode; and means for moving said second release means to its second position in response to actuation of said first release means.

2. The structure of claim 1 wherein said first release means includes a film snubber in contact with the film, biasing means of a preset value for biasing said snubber into contact with the film to maintain a preset tension in the film, a pivotable latch normally engaged with said release latch to maintain said release latch in its latching position, and means associated with said snubber engaeable with said pivotable latch when said preset value is exceeded to release said release latch to permit said release latch to release said operative slide.

3. The structure of claim 1 wherein said second release means includes a control knob, a shaft connected to said control knob and rotatable thereby, a lever mounted for pivotal movement and engageable with said release latch, eccentric cam means rotatable with said shaft, and engageable with said lever whereby movement of said eccentric cam will cause movement of said lever to release said release latch.

4. The structure of claim 3 wherein a second cam is mounted on said shaft and wherein said means for activating said supply reel drive means includes a lever engageable with said second cam, said lever being actuated by said second cam when said shaft is rotated to position said control knob of said second release means in its rewind indicating position.

5. The structure of claim 4 wherein said means for moving said second release means to its second position when said release latch is selectively activated by said first release means comprises an opening formed in said operative slide through which said lever extends, the location of said opening being selected such that upon movement of said operative slide from said first position to said second position one end wall of said opening will engage said lever to pivot said lever whereby said lever will rotate said eccentric cam to rotate said shaft and the control knob associated therewith to the rewind-indicating second position.

* * * * *

PO-1050
(5/69)

UNITED STATES PATENT OFFICE
CERTIFICATE OF CORRECTION

Patent No. 3,815,983  Dated June 11, 1974

Inventor(s) William L. Burnham, Kenneth W. Thomson

It is certified that error appears in the above-identified patent and that said Letters Patent are hereby corrected as shown below:

Col. 1, line 19, After "Re." insert -- 27,299 --

Col. 1, line 45, "senswng" should be -- sensing --

Col. 5, line 15, "estblishing" should be -- establishing --

Col. 5, line 19, "know" should be -- knob --

Col. 6, line 7, After "apparatus" insert -- operable --

Col. 6, line 54, "engaeable" should be -- engageable --

Signed and sealed this 29th day of October 1974.

(SEAL)
Attest:

McCOY M. GIBSON JR.
Attesting Officer

C. MARSHALL DANN
Commissioner of Patents